United States Patent
Mi

(10) Patent No.: US 9,019,233 B2
(45) Date of Patent: *Apr. 28, 2015

(54) PROJECTED CAPACITIVE TOUCH PANEL AND METHOD OF MANUFACTURING THE SAME

(71) Applicant: TPK Touch Solutions Inc., Taipei (TW)

(72) Inventor: David Mi, Pingzhen (TW)

(73) Assignee: TPK Touch Solutions Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/986,078

(22) Filed: Mar. 14, 2013

(65) Prior Publication Data

US 2013/0215082 A1 Aug. 22, 2013

Related U.S. Application Data

(63) Continuation-in-part of application No. 12/661,787, filed on Mar. 24, 2010, now Pat. No. 8,686,965.

(30) Foreign Application Priority Data

Jan. 26, 2010 (TW) ................................ 99102092 A

(51) Int. Cl.
*G06F 3/045* (2006.01)
*G06F 3/044* (2006.01)

(52) U.S. Cl.
CPC ...... *G06F 3/044* (2013.01); *G06F 2203/04103* (2013.01)

(58) Field of Classification Search
CPC .......... G06F 3/041–3/047; G06F 2203/04111; G06F 2203/04112; G06F 2203/04103

USPC .......... 345/173–178; 178/18.01–18.09, 18.11
See application file for complete search history.

(56) References Cited

U.S. PATENT DOCUMENTS

| | | | |
|---|---|---|---|
| 8,487,904 B2 | 7/2013 | Mi | |
| 2002/0011992 A1* | 1/2002 | Muraoka et al. | 345/174 |
| 2005/0030048 A1* | 2/2005 | Bolender et al. | 324/661 |
| 2005/0046622 A1* | 3/2005 | Nakanishi et al. | 345/173 |
| 2007/0062739 A1* | 3/2007 | Philipp et al. | 178/18.06 |
| 2008/0007534 A1* | 1/2008 | Peng et al. | 345/173 |
| 2008/0158198 A1* | 7/2008 | Elias | 345/174 |
| 2009/0321240 A1 | 12/2009 | Huang et al. | |
| 2010/0006347 A1* | 1/2010 | Yang | 178/18.01 |
| 2010/0078231 A1 | 4/2010 | Yeh et al. | |
| 2010/0139955 A1 | 6/2010 | Long et al. | |

(Continued)

FOREIGN PATENT DOCUMENTS

| | | |
|---|---|---|
| JP | 2008250309 | 10/2008 |
| JP | 2009216978 | 9/2009 |

(Continued)

*Primary Examiner* — Stephen Sherman
(74) *Attorney, Agent, or Firm* — Gokalp Bayramoglu

(57) ABSTRACT

A projected capacitive touch panel has a glass cover, a touch sensing circuit layer, an insulating ink Layer, a conductive wire layer, an insulator layer, a conductive glue layer and a flexible printed circuit (FPC) board. The touch sensing circuit layer, the insulating ink layer the conductive wire layer, the insulator layer and the conductive glue layer are mounted on a circuit surface of the glass cover in sequence. The insulating ink layer cover the touch sensing circuit layer and has multiple through slots. Each through slot is filled with an electric conductor. The FPC is fastened on the conductive wire layer by a conductive glue layer.

30 Claims, 15 Drawing Sheets

(56) References Cited

U.S. PATENT DOCUMENTS

| | | |
|---|---|---|
| 2010/0265207 A1 | 10/2010 | Chen et al. |
| 2010/0283755 A1 | 11/2010 | Hsih |
| 2012/0319966 A1* | 12/2012 | Reynolds .................. 345/173 |

FOREIGN PATENT DOCUMENTS

| | | |
|---|---|---|
| JP | 2011192124 | 9/2011 |
| KR | 1020110110562 | 10/2011 |
| TW | 200846997 | 12/2008 |
| TW | M348999 | 1/2009 |
| TW | M355426 | 4/2009 |
| TW | 200949341 | 12/2009 |
| TW | M374617 | 2/2010 |
| TW | M397557 | 2/2011 |
| WO | WO2008047971 | 4/2008 |

* cited by examiner

PROJECTED CAPACITIVE TOUCH PANEL AND METHOD OF MANUFACTURING THE SAME

CROSS-REFERENCE TO RELATED APPLICATIONS

This application is a continuation-in-part of U.S. patent application Ser. No. 12/661,787, filed Mar. 24, 2010, the entire contents of which are incorporated herein by reference.

TECHNICAL FIELD

The present disclosure relates to a protected capacitive touch panel, more particularly to a projected capacitive touch panel with a single glass.

BACKGROUND

The advanced touch panel technology has resulted in many consumer electronic products, such as personal digital assistant (PDA), global positioning systems (GPS), and the like being equipped with touch panels Before iPhone™ was released, resistive touch panels were generally used on small sized portable electronic devices because these panels were low-cost, reliable, and had sufficiently matured. In addition, resistive touch panels cannot track more than one finger touch, restricting resole multipoint touches Once the iPhone™ was announced, there existed a need of projected capacitive touch panels became desirable as these panels enable multipoint touch.

As shown in FIG. 12, a conventional protected capacitive touch panel comprises a glass base (91), a touch sensing circuit layer (92), a conductive wire layer (93), an insulator layer (94), a conductive glue layer (95), a flexible printed circuit (FPC) board (96), an optical glue layer (97), and a glass cover (98), The glass base (91) includes a circuit surface (911). The touch sensing circuit layer (92) includes touch sensing circuits. Further, the touch sensing circuit layer (92) and the conductive wire layer (93) are electronically connected together and formed on the circuit surface (911) of the glass base (91). The insulator layer (94) is formed such that it covers the conductive wire layer (93). The insulator layer (94) includes a breach that partially exposes the conductive wire layer (93). Additionally, the conductive glue layer (95) is formed on the breach to cover the exposed conductive wire layer (93). The FPC board (96) is attached to the conductive glue layer (95), thereby electronically connecting to the conductive wire layer (93) via the conductive glue layer (951 The optical glue layer (97) is formed on the touch sensing circuit layer (92) and the insulator layer (94). Moreover the glass cover (98) includes an operating surface (981) and an adhering surface (982). The adhering surface (982) is adhered to the optical glue layer (97). The operating surface (981) of the glass cover (98) may function either as a touch surface or a protection cover to protect the touch sensing circuit layer (92), the conductive wire layer (93) and the conductive glue layer (95) on the glass base (91).

The conventional projected capacitive touch panel requires two glasses (91, 98) which are fixed by the optical glue layer (97), as a result, the touch panel exhibits the following aspects 1. The optical glue layer (97) is positioned between the glass base (91) and the glass cover (98), reducing penetrability of the conventional projected capacitive touch panel.

2. Adhering the two glasses (91, 98) requires great accuracy so affecting manufacturing yield rate. Current techniques cannot provide high accuracy of adhering the glasses for increasing yield rate of manufacturing the conventional projected capacitive touch panel.

3. Transparent optical glue layer (97) allows the insulator her (94) and the FPC board (96) to be visible from the operating surface (981) of the glass cover (98). The conventional projected capacitive touch panel installation on an electronic device requires a casing on the electronic device having opaque rims to cover the insulator layer (94) and the FPC board (96). However, such design limitation restricts application and also requires accurate machining, increasing cost and reducing manufacturing yield.

SUMMARY

In accordance with one embodiment, a projected touch panel includes a glass cover, a touch sensing circuit layer, an insulating ink layer, and a conductive wire layer. The glass cover includes an operating surface and a circuit surface. The touch sensing circuit layer is mounted on the circuit surface of the glass covet The touch sensing circuit layer has at least a first edge and a second edge, wherein the first edge and the second edge are opposite to each other. The insulating ink layer with multiple through slots covers edges of the touch sensing circuit layer Each through slot is filled with an electric conductor, electronically connecting the conductive wire layer with the touch sensing circuit layer In another aspect, a projected capacitive touch panel comprises a glass cover having an operating surface and a circuit surface. A touch sensing circuit layer is mounted on the circuit surface of the glass cover for generating actuated sensing signals in response to a touch action on the projected capacitive touch panel. The touch sensing circuit layer includes multiple edges and a plurality of first conductive assemblies. These assemblies are parallelly arranged in a first direction, and each of the first conductive assemblies has a first end and a second end opposite to the first end. The projected capacitive touch panel further includes an insulating ink layer formed on the edges of the touch sensing circuit layer. The insulating ink layer has multiple through slots that expose the first end and the second end of the first conductive assemblies. Each through slot has an electric conductor within the slot. The projected capacitive touch panel further comprises a conductive wire layer that is formed on the insulating ink layer so that the conductive wire layer at least electronically connects the first end and second end of the first conductive assemblies via the electric conductors in the through slots.

Therefore, the touch panel can be thin, providing high yield rate.

DETAILED DESCRIPTION

Figure 1A:
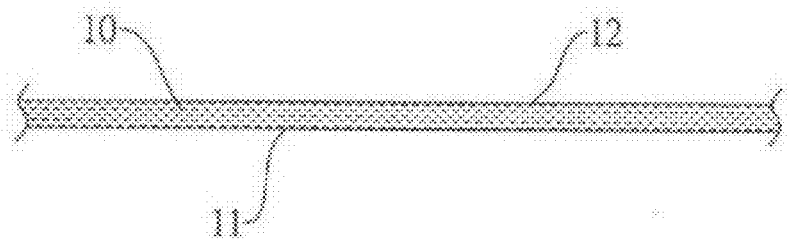
FIGS. 1A to 1H depict a series of cross sectional views of a projected capacitive touch panel undergoing a manufacturing process in accordance with the first embodiment of the present invention.

A method of manufacturing a projected capacitive touch panel according to a first embodiment of the present invention comprises steps of providing a glass parent board forming touch sensing circuit layers, forming insulating ink layers having multiple through slots, forming electric conductors in the through slots, forming conductive wire layers, forming insulator layers, separating the glass parent board into multiple glass covers, installing a flexible printed circuit (FPC) board on one separated glass cover and applying a consolidating glue layer With reference to FIG. 1A, a glass parent board is divided into multiple glass covers (10), and each glass cover (10) has an operating surface (11) and a circuit surface (12).

Figure 1B:
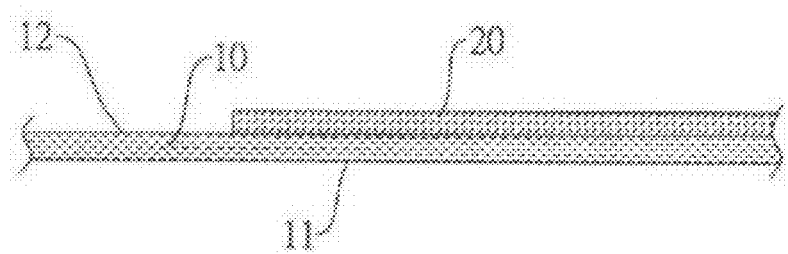
Figure 2:
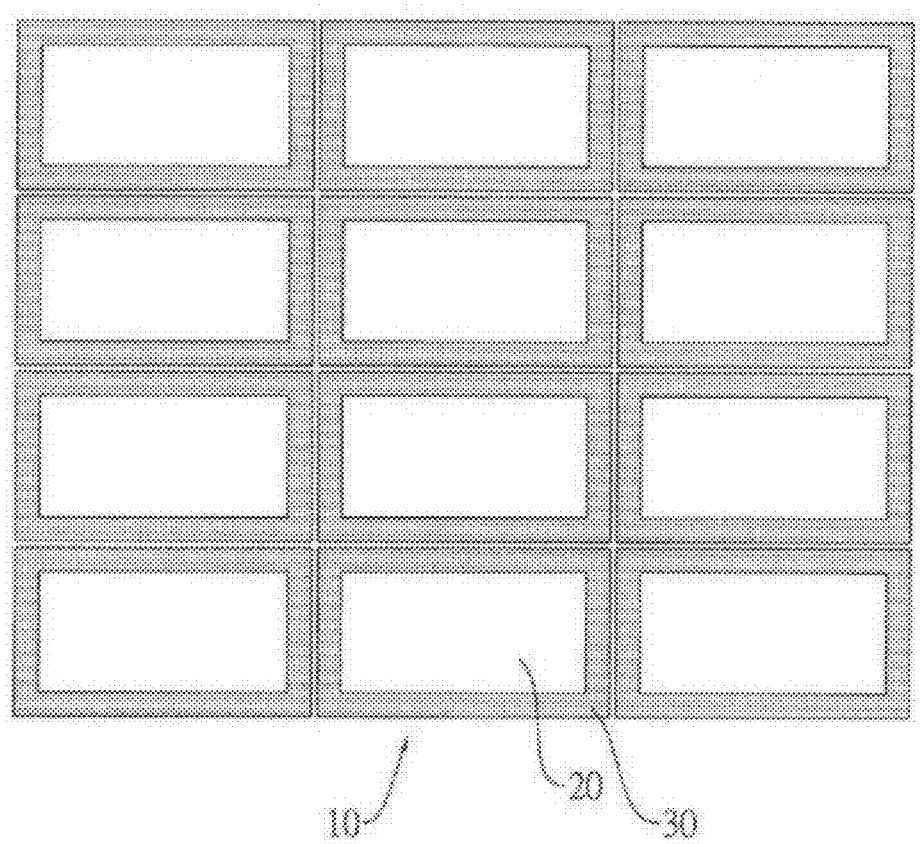
FIG. 2 is a representation of touch sensing circuit layers, and insulating ink layers on a glass parent board.

With reference to FIG. 1B, each touch sensing circuit layer (20) is partially formed on the circuit surface (12) of each glass cover (10) Bar generating actuated sensing signals in response to a touch action on the single-layer projected capacitive touch panel. In FIG. 2, each touch sensing circuit layer (20) is formed on a central zone of the circuit surface (12) of each glass cover (10). Each touch sensing circuit layer (20) has at least two opposite edges.

Figure 3:
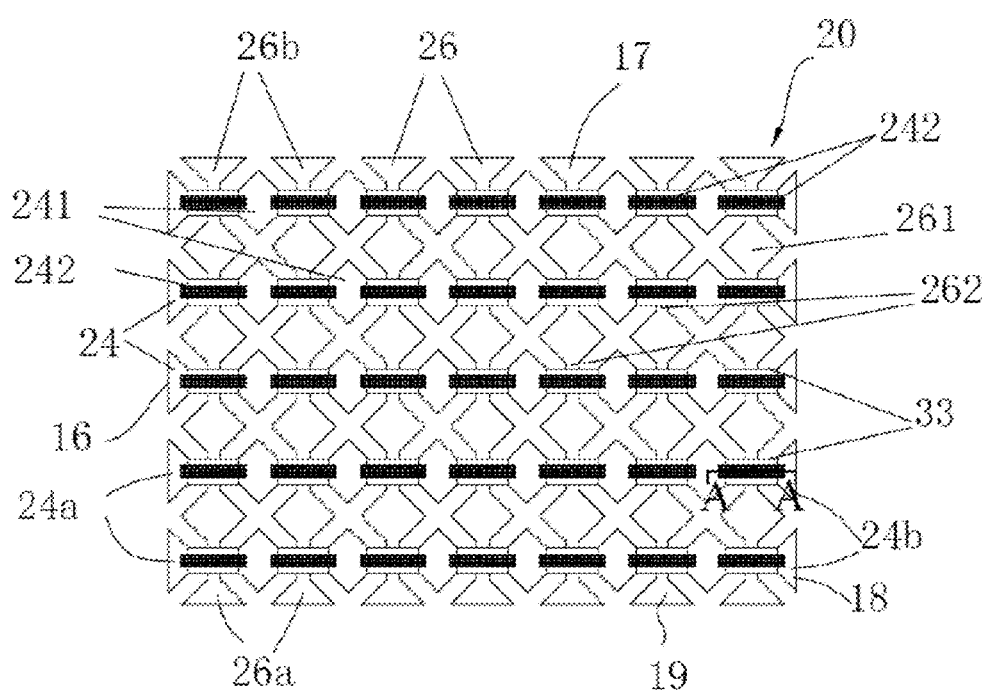
FIG. 3 is a top view of touch sensing circuit layers of a projected capacitive touch panel in accordance with the first embodiment of the present invention.

With further reference to FIG. 3, the touch sensing circuit layer (20) has two pairs of opposite edges (16, 17, 18, 19), wherein the second edge (18) is opposite to the fist edge (16) and the fourth edge (17) is opposite to the final edge (19). The touch sensing circuit layer (20) includes a plurality of first conductive assemblies (24) parallelly arranged in a first direction (such as horizontal direction). In addition, the touch sensing circuit layer (20) includes a plurality of second conductive assemblies (26) parallelly arranged in a second direction (such as longitudinal direction). In one example, the first conductive assemblies (20) and the second conductive assemblies (26) are arranged perpendicular to each other forming a matrix structure. Each first conductive assembly (24) includes a plurality of first conductive cells (241), equally spaced along the first direction. Each second conductive assembly (26) includes a plurality of second conductive cells (261), equally spaced along the second direction The adjacent first conductive cells (241) in the same first conductive assembly are interconnected by a first conductive line (242). Moreover, the adjacent second conductive cells (261) in the same second conductive assembly are interconnected by a second conductive line (262).

Figure 4A:
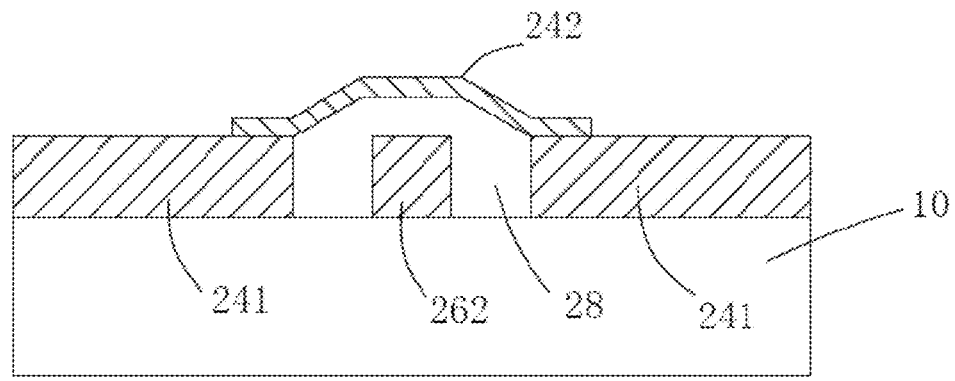
FIG. 4A to 4E are cross sectional views of various touch sensing circuit layers of a projected capacitive touch panel drawn along AA' line in FIG. 3 in accordance with the first embodiment of the present invention.

As shown in FIG. 4A, the touch sensing circuit layer (20) includes a plurality of insulating elements (28) disposed between the first conductive lines (242) and the second conductive lines (262), which are used to insulate the first conductive lines (242) from the second conductive lines (262).

Figure 4B:
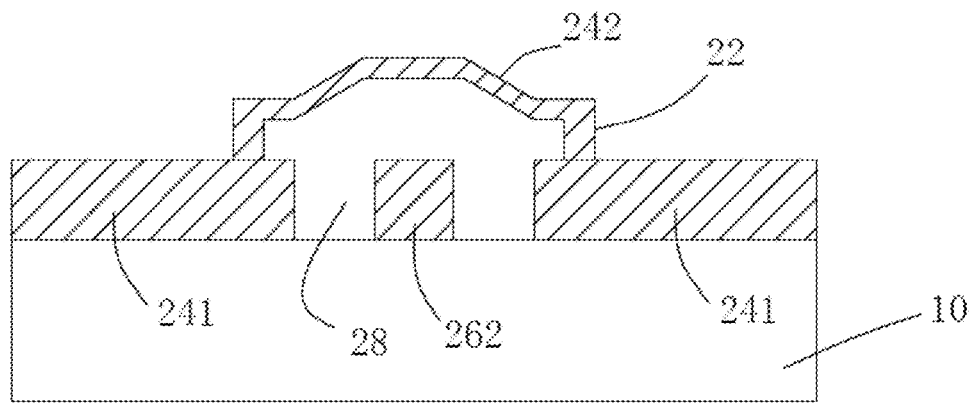
Figure 4C:
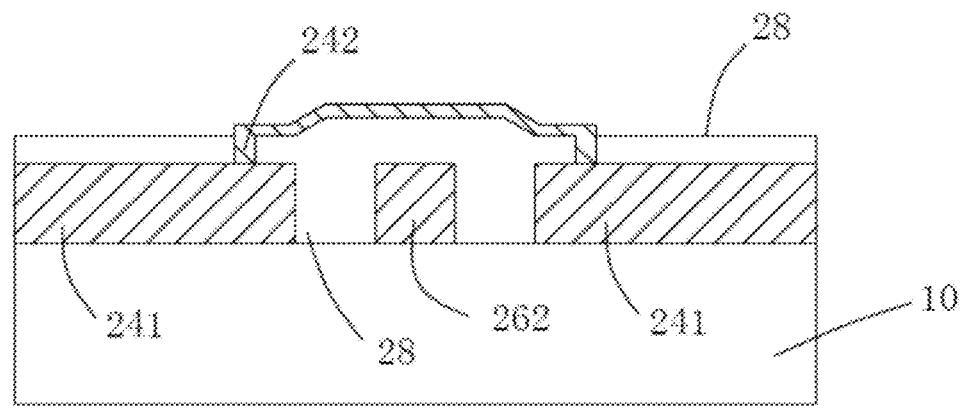

In an alternative example shown in FIG. 4B, the insulating elements (28) cover the second conductive lines (252) and at least part of the first conductive cells (241). The first conductive lines (242) are configured or disposed on the insulating elements (28) and electrically coupled with the first conductive cells (241). In another example shown in FIG. 4C, the insulating elements (28) cover the second conductive lines (262) and the first conductive cells (241). The first conductive lines (242) are configured or disposed on the insulating elements (22) and electrically coupled with the first conductive cells (241) via the through holes (22) formed in the insulating elements (28).

Figure 4D:
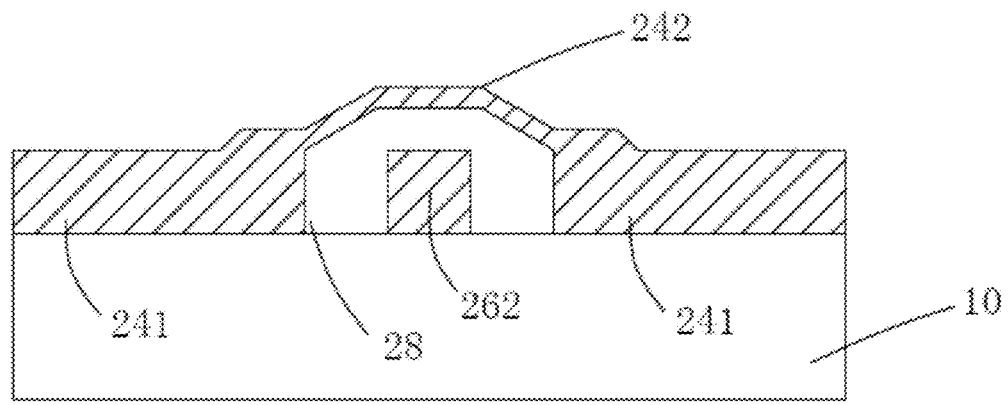

In an alternative example shown in FIG. 4D, the insulating elements (28) cover the second conductive lines (262). The first conductive lines (242) and the first conductive cells (241) are made of the same material at the same time. Alternatively, the first conductive cells (241) are configured first and electrically coupled with the first conductive lines (242) made a the same materials. In examples shown in FIGS. 4A-4D, the second conductive cells (261) and the second conductive lines (262) are formed in the same layer. Alternatively, the first conductive cells (241) and the first conductive lines (242) are formed in the same layer.

In one embodiment, the first conk dive cells (241) and the second conductive cells (261) are shaped as diamond contour. Other polygon contour, such as hexagon, octagon, rectangle, square, triangle etc., known to a person skilled in the art, can also be used as the shape of the first and second conductive cells (241 261), first conductive cells (241) and the second conductive cells (261), for example, are made of transparent conductive material, such as Indium Tim Oxide (ITO), Antimony Tin Oxide (ATC) or Titanium Oxide (TiO2).

The insulating elements (28) are made of transparent insulating material such as epoxy resin, polyimide polyvinyl chloride, and methyl methacrylate. Alternatively, the insulating elements (28) and the first and second conductive cells (241, 261) may have substantially similar refractive index. The refractive index of insulating elements (28) could range from 1.5 to 2.1, such as. TiO2: about 1.7-1.8, SiO2: about 1.5-1.6. Nb2O5: about 2.0-2.1, and transparent insulating photoresist: about 1.5-1.6. The insulating elements (28) may further be placed among the conductive cells (241, 261) and the conductive lines (242, 767).

Figure 4E:
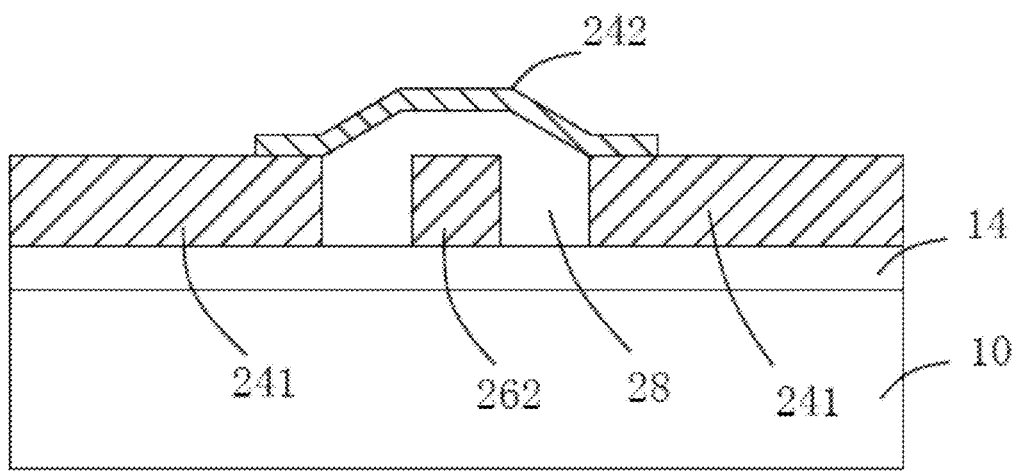

Turning to FIG. 4E, a refractive index matching material (14) is configured or disposed on the circuit surface (12) of the glass cover (10) to obtain a good appearance. In an implementation, the refractive index of the refractive index matching material matches the refractive index of the conductive cells (241, 261) so that the difference reflectance there between can be kept small. The difference in the refractive index of the conductive cells and the refractive index matching material is preferably less than 0.5. Optionally, the glass cover (10) further includes a material of the element selected from the group of anti-scratch material, anti-glare material, and anti-reflective material, configured or disposed on the operating surface (11) of the glass cover (10). In one implementation, the first conductive assemblies or the second conductive assemblies are formed by photolithography.

Figure 1C:
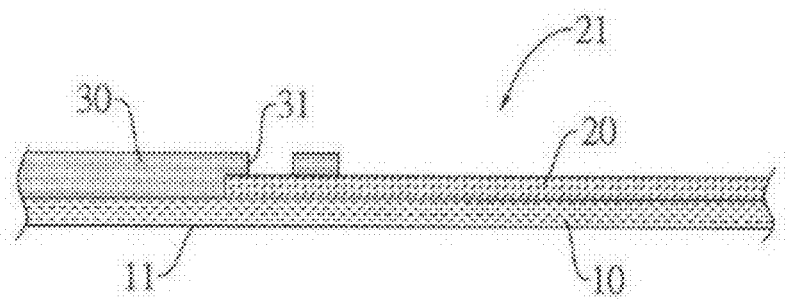

With reference to FIG. 1C and FIG. 2, in the step of forming insulating ink layers having multiple through slots, each insulating ink layer (30) is formed on and near the edges of each touch sensing circuit layer (20). The insulating ink layer (30) partially cover the touch sensing circuit layer (20), defining a touch zone (21) as uncovered areas of the touch sensing circuit layer (20). Further, each insulating ink layer (30) has multiple through slots (31) that expose the touch sensing circuit layer (20) covered by the insulating ink layer (30). In an example, the opening area of each through slot from the top view is from 0.5 to 2 mm2. The insulating ink layer (30) is made of opaque insulating material, such as opaque black ink or opaque white ink, and the insulating ink layer (30) is formed on the glass cover (10) and partial touch sensing circuit layer (20) by using printing and curing technique. Consequently, other elements subsequently mounted on the insulating ink layer (30) are invisible when viewed from the operating surface (11) of the glass cover (10). The materials of the insulating ink layer (30) can be chosen from thermal post curing insulating ink or UV-curing insulting ink.

Figure 1D:
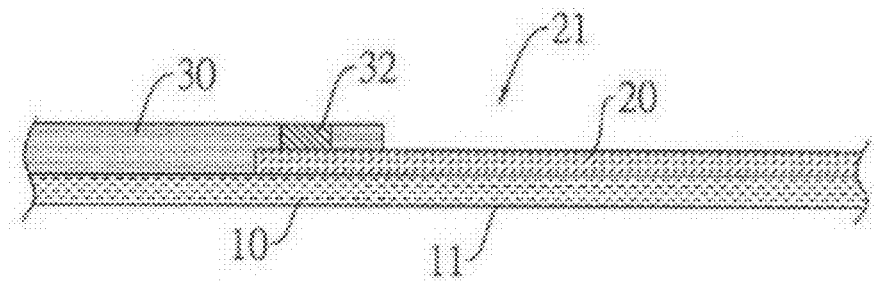
Figure 1E:
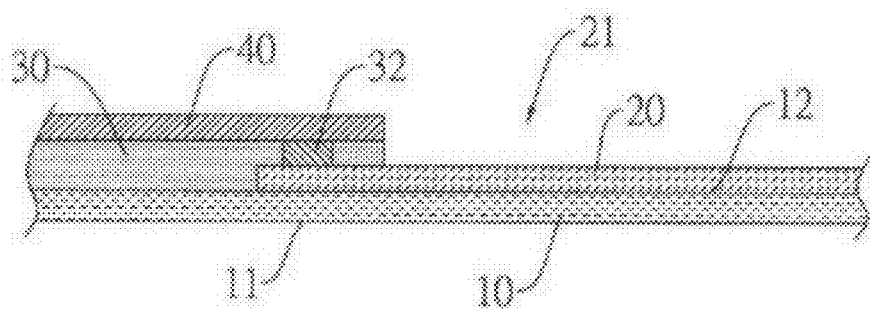
Figure 5A:
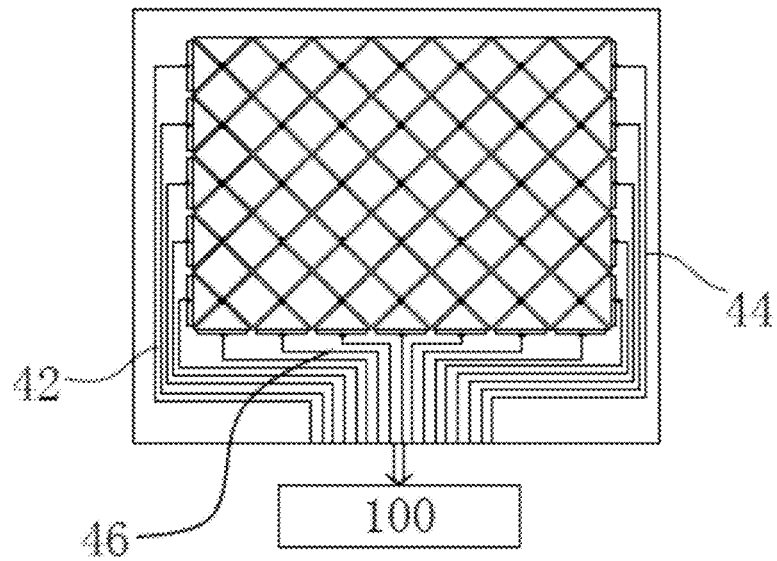
FIGS. 5A-5C are top views of various conductive wire layers of a projected capacitive touch panel in accordance with the first embodiment of the present invention.
Figure 5B:
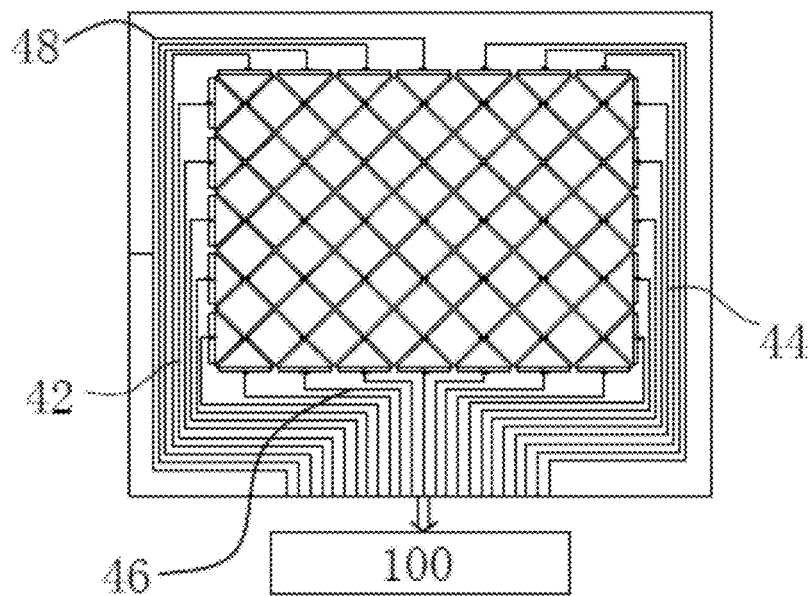
Figure 5C:
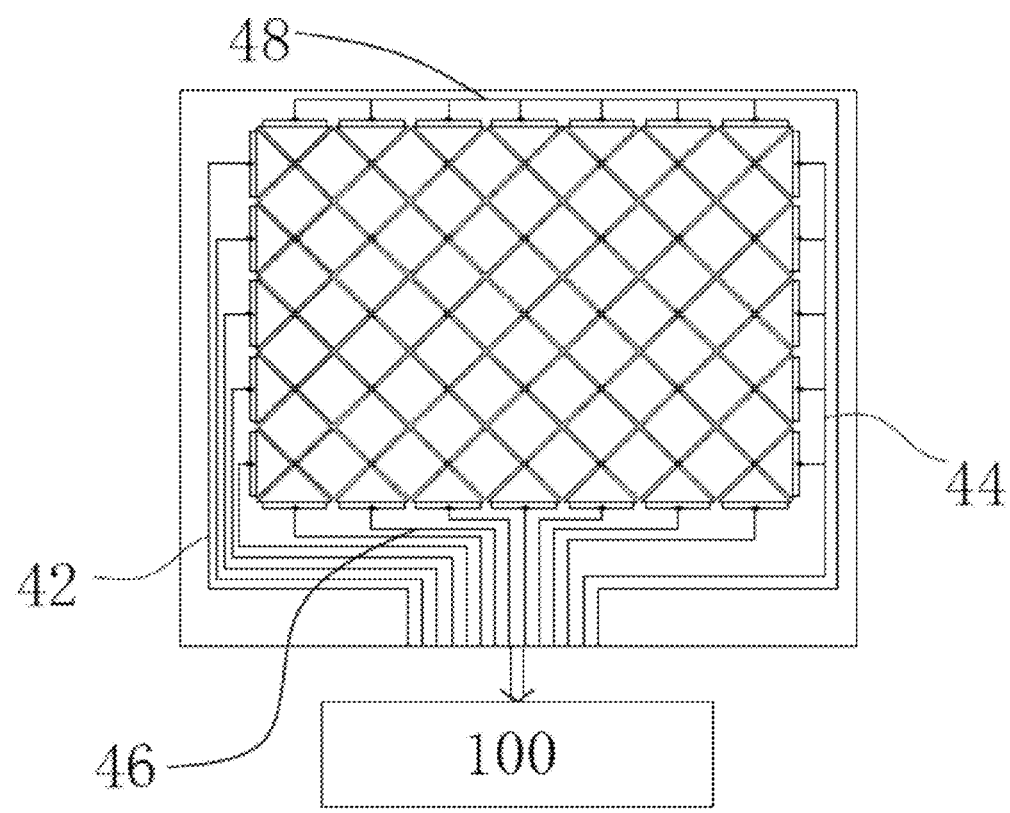

With reference to FIG. 1D, in the step of forming electric conductors in the through slots, the electric conductors (32) are filled respectively in the through slots (31). In an embodiment, color of each electric conductor (32) may be similar to the color of the insulating ink layer (30) to avoid people easily seeing the through slots (32) from the operating side (11) of the glass cover (10). The materials of the electric conductors (32) may be chosen from conductive silver paste or conductive carbon paste, and the color of the electric conductors (32) is black, red, or white. The electric conductors (32) may be filled by one of the methods: printing or photolithography With reference to FIG. 1E, in the step of forming conductive wire layers, the conductive wire layers (40) are formed on each of the insulating ink layers of the glass covers (10) on the glass parent board contacting the electric conductors (32). Therefore, the conductive wire layers (40) electronically connect to each of the touch sensing circuit layers (20) via the electric conductors (32). In one example as shown in FIG. 3, each conductive wire layer (40) at least electronically connects to both the first edge (16) and the second edge (18) of the corresponding touch sensing circuit layer (20). The conductive wire layer (40) may further electronically connect to both the third edge (19) and the fourth edge (17) of the corresponding touch sensing circuit layer (20). The conductive wire layers (40) can be made of silver glue or carbon glue using printing technique. In one example as shown in FIG. 5A, each conductive wire layer (40) includes a plurality of first signal lines (42), a plurality of second signal lines (44) and a plurality of third signal lines (46) for transmitting the sensing signals to a controller (100). The first end (24a) of each first conductive assembly (24) is connected to each of the first signal lines (42) through a corresponding electric conductor (32). The second end (24b) of each first conductive assembly (24) is connected to each of the second signal lines (14) through a corresponding electric conductor (32). The first end (26a) of each second conductive assembly (26) is connected to each the third signal Lines (46) through a corresponding electric conductor (32). In an alternative example shown in FIG. 5B, each conductive wire layer (40) further includes a plurality of fourth signal lines (48) such that the second end (26a) of each second conductive assembly (26) is respectively connected to the fourth signal lines (48) through a corresponding electric conductor (32). In another example shown in FIG. 5C, each conductive wire layer (40) includes a plurality of first signal lines (42), plurality of second signal lines (44), a plurality of third signal lines (46) and a plurality of fourth signal lines (48). Compared to the example shown in FIG. 5B, there are two common signal lines connected to a constant signal source, the second signal lines (44) and the fourth signal lines (48) in this example. The conductive wire layer may connect to one end or both ends of the conductive assembly based on the size of the touch panel. For instance for large-size touch panel used for TV's, the conductive wire layer may be required to connect to both ends of the conductive assembly, since the signal will decay during the signal transmission in long distance.

Figure 1F:
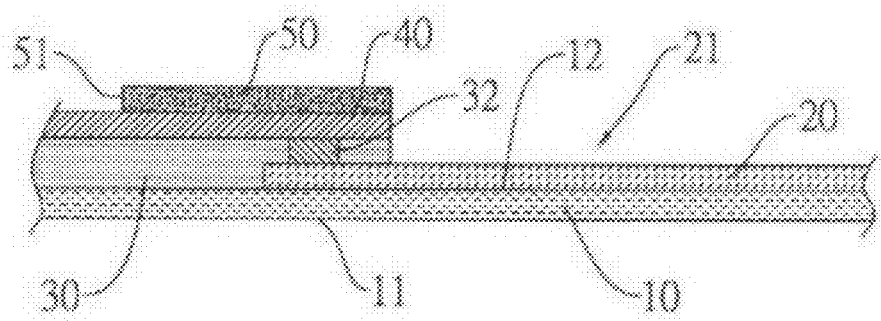

With reference to FIG. 1F, in the step of forming insulator layers, the insulator layers (50) are formed respectively on the conductive wire layers (40) by using screen printing technique to prevent the conductive wire layers (40) from oxidation. Further, each insulator layer (50) has a breach (51) to partially expose the conductive wire layer (40). The insulator layers (50) can be made of thermal pest curing material or UV-curing material.

In the step of separating the glass parent board, the glass parent board is separated into multiple glass covers (10) using a cutting machine.

Figure 1G:
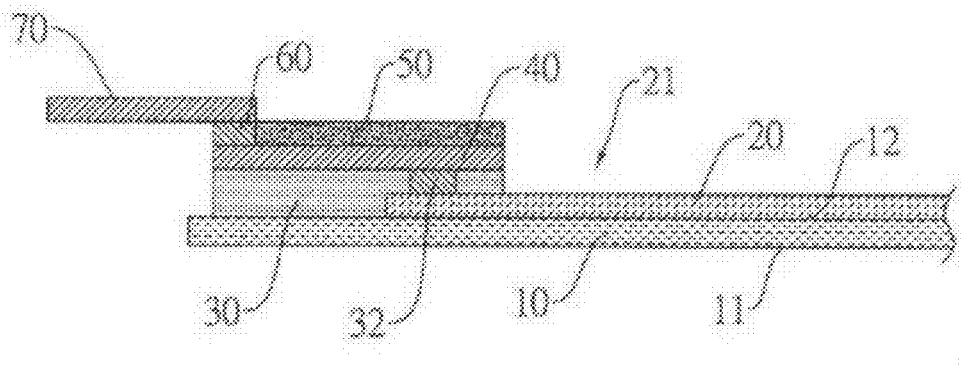

With reference to FIG. 1G the step of installing a FPC board on one separated glass cover, the FPC board (70) is attached to the breach (51) of the insulator layer (50) on the separated glass cover (10) with a conductive glue layer (60). The FPC board (70) is electronically connected to the conductive wire Layer (40) exposed through the insulator layer (50) via the conductive glue layer (60). The conductive glue layer (60) can be made of anisotropic conductive film (ACF) or anisotropic conductive paste (ACP) and the FPC board (70) is attached to the exposed conductive wire layer (40) with the conductive glue layer (60) by using a heat seal machine.

Figure 1H:
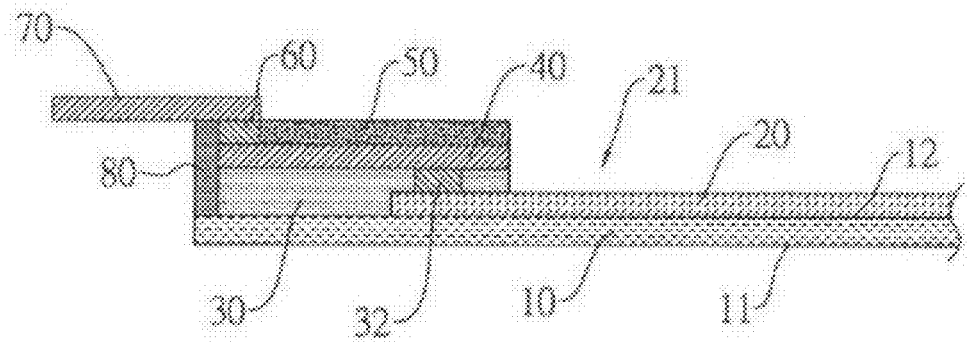
Figure 6:
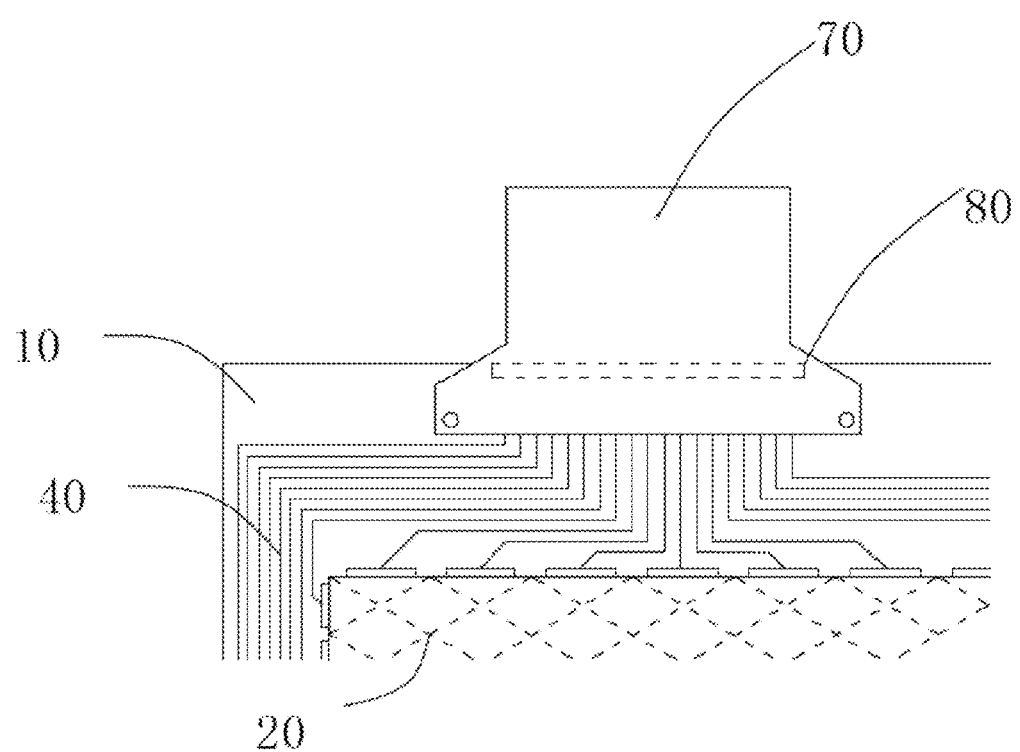
FIG. 6 is a top view of a flexible printed circuit board-mounted on a glass cover.

With reference to FIG. 1H and FIG. 6, in the step of applying a consolidating glue layer, the consolidating glue layer (80) is applied to and between the FPC board (70) and the glass cover (10) along or near the outer periphery of the insulating ink layer (30) to enhance fastening the FPC board (70) and prevent the FPC board (70) from coming off during other follow-up manufacturing procedures due to improper installation or dragging. The materials of the consolidating glue layer (80) can be chosen from polyurethane (PU) or silica gel.

Figure 7:
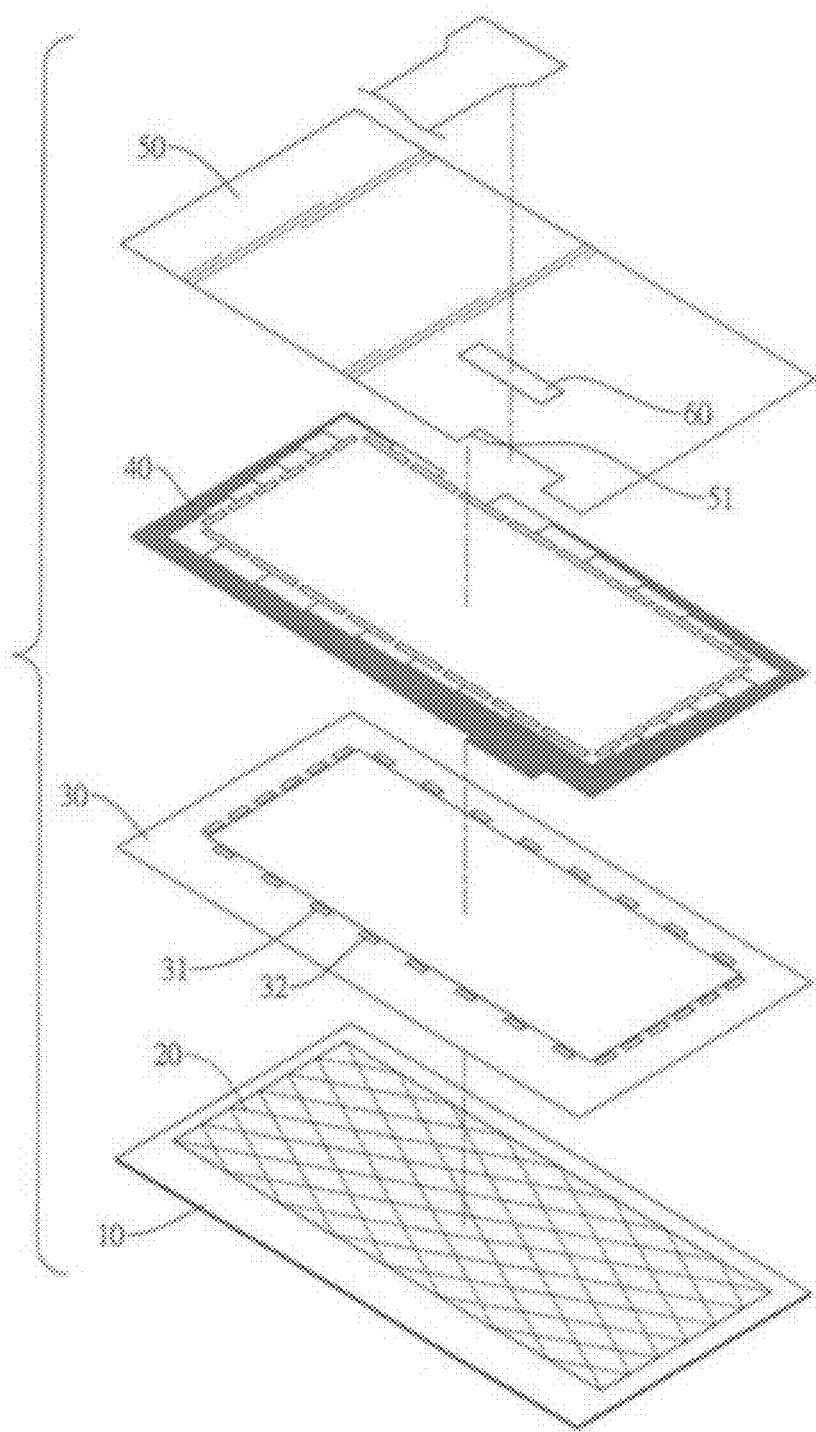
FIG. 7 illustrates an explosive view of the single-layer projected capacitive touch panel in accordance with the first embodiment of the present invention.

Therefore, with further reference to FIG. 7, a projected capacitive touch panel in accordance with the first embodiment of the present invention manufactured by the above-mentioned method comprises a glass cover (10), a touch sensing circuit layer (20), insulating ink layer (30), a conductive wire layer (40), an insulator layer (50) a conductive glue layer (60), a FPC board (70) and a consolidating glue layer (8O).

The glass cover (10) has an operating surface (11) and a circuit surface (11). In one example, the operating surface (11) is for users to touch.

The touch sensing circuit layer (20) for generating actuated sensing signals in response to a touch action on the single-layer projected capacitive touch panel is mounted on the circuit surface (12) of the glass cover (10) and has at least two opposite edges. In one example, the touch sensing circuit layer (20) has a first edge and a second edge, wherein the first edge and the second edge are opposite to each other.

The insulating ink layer (30) is formed on and covers the edges of the touch sensing circuit layer (20), and the uncovered touch sensing, circuit layer (20) is defined as a touch zone (21). The insulating ink layer (30) further has multiple through slots (31). The through slots (31) correspond to and expose the touch sensing circuit layer (20) covered by the insulating ink layer (30), and each through slot (31) is filled with an electric conductor (32). The color of each electric conductor can be similar to color of the insulating ink layer.

The conductive wire layer (40) is formed on and covers the insulating ink layer (30) such that the conductive wire layer (40) electronically connects to the touch sensing circuit layer (30) via the electric conductors (32) in the through slots (31). The sensing signals generated from the touch sensing circuit layer (20) are transmitted to a controller through the conductive wire layer (40). In one example, the conductive wire layer at least electronically connects the first edge and the second edge of the touch sensing circuit layer via the electric conductors in the through slots The insulator layer (50) with a breach (51) is thrilled on and covers the conductive wire layer (40). The breach (51) partially exposes the conductive wire layer (40).

The conductive glue Layer (60) is mounted on the breach (51) of the insulator layer (50) to cover the exposed conductive. wire layer (40).

The FPC board (70) is attached to the conductive glue layer (60) to be mounted on the breach (51) of the insulator layer (50) and electronically connects to the conductive wire layer (40) via the conductive glue layer (60).

The consolidating glue layer (80) is applied to and between the FPC board (70) and the glass cover (10). The consolidating glue layer can be located along the outer periphery of the insulating ink layer.

A method of manufacturing a single-layer projected capacitive touch panel according to a second embodiment of the present invention comprises steps of providing a glass parent board, forming touch sensing circuit layers, forming insulating ink layers having multiple through slots, forming electric conductors in the through slots, forming conductive wire layers, forming insulator layers, each insulator layer with at least one breach to partially expose the conductive wire layer, forming a conductive element in the breach and separating the glass parent board into multiple glass covers The aforesaid steps are similar to those of the first embodiment depicted in FIG. 1A to FIG. 1E.

Figure 8A:
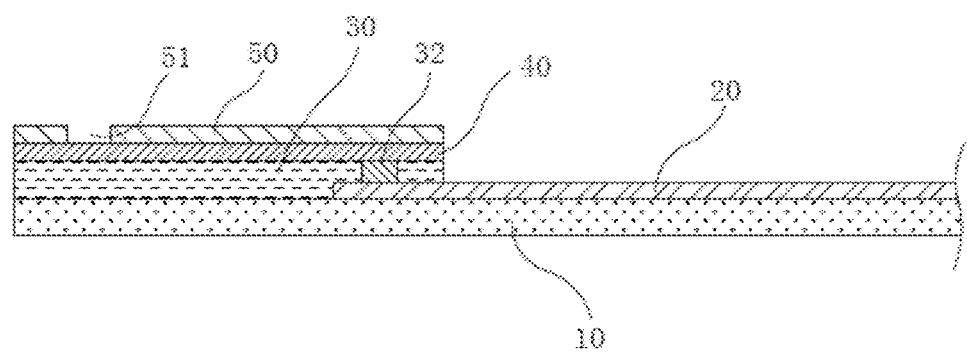
FIGS. 8A to 8B depict a series of cross sectional side views of manufacture of a projected capacitive touch panel in accordance with the second embodiment of the present invention.
Figure 9A:
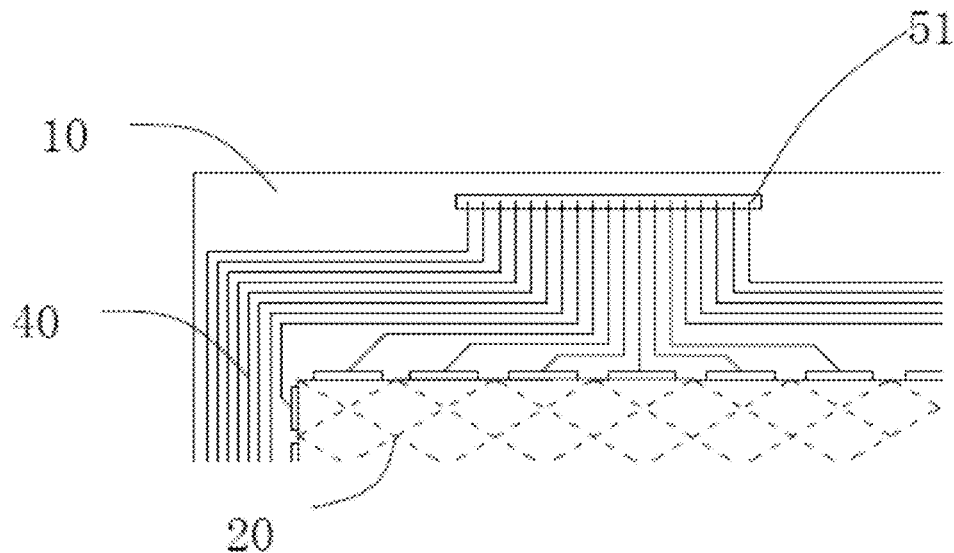
FIGS. 9A to 9B illustrate top views of various insulator layers of a projected capacitive touch panel in accordance with the second embodiment of the present invention.
Figure 9B:
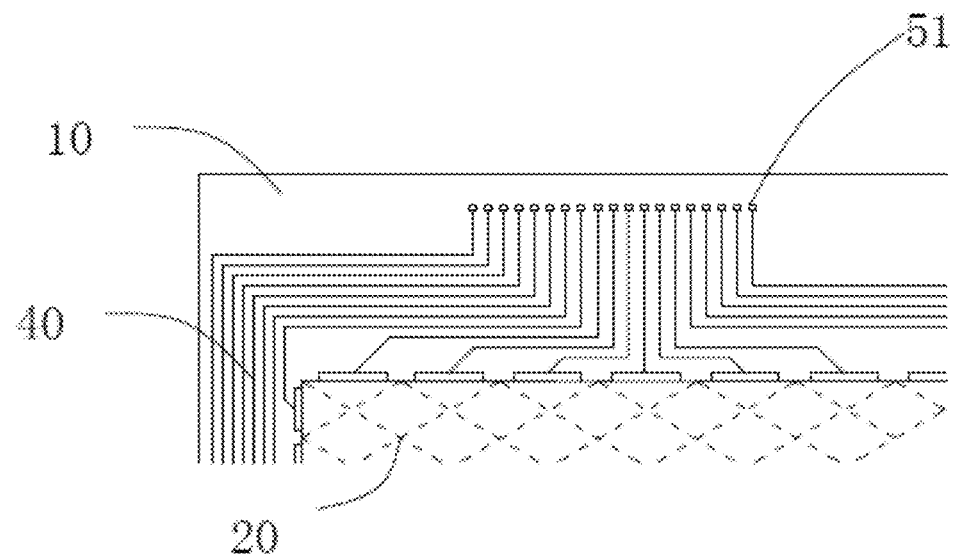

With reference to FIG. 8A, in the step of forming insulator layers to prevent the conductive wire layers (40) from oxidation each insulator layer is provided with at least one breach to partially expose the conductive wire layer, and the insulator lavers (50) are formed respectively on the conductive wire layers (40) by using printing technique. In one example shown in FIG. 9A, each insulator layer (50) has a breach (51) to partially expose the conductive wire layer (40). In an alternative example Shown in FIG. 9B, each insulator layer (50) has multiple breaches (51). Each breach (51) is formed corresponding to and exposing one end of each signal line of the conductive wire layer (40). The insulator layers (50) can be made of opaque or transparent material.

Figure 8B:
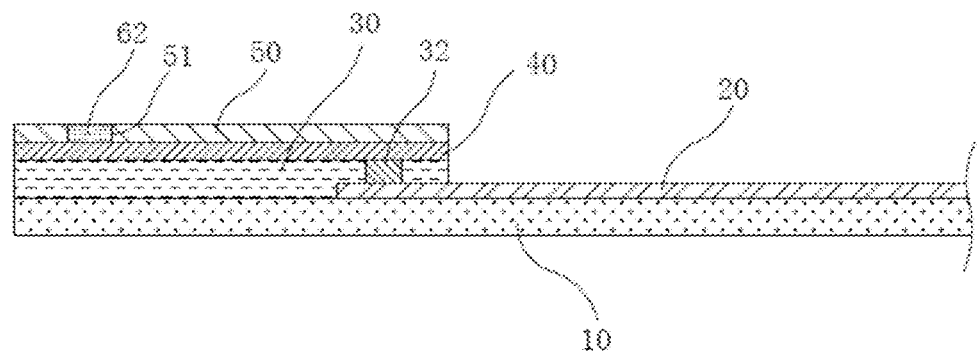
Figure 10:
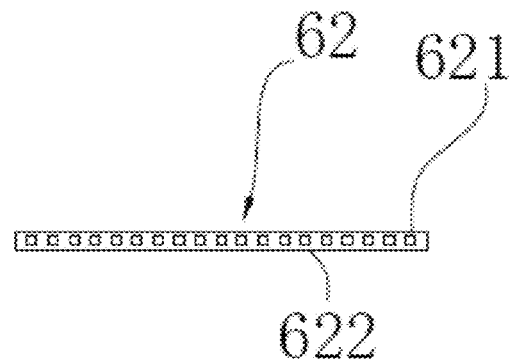
FIG. 10 is a top view of a conductive element of a projected capacitive touch panel in accordance with the second embodiment of the present invention.

With reference to FIG. 8B, in the step of forming a conductive element in the breach, the conductive elements (62) are filled, attached or installed respectively in the breaches (51). The conductive elements (62) can be made of anisotropic conductive film (ACF) or anisotropic conductive paste (ACP), and filled respectively in the breaches (51) (such as the breaches (51) shown in FIG. 9A) such that when the single-layer projected capacitive touch panel in accordance with this embodiment is integrated into a display panel, such as liquid display screen, the printed circuit board mounted on a display panel is electrically connected to the signal lines of the conductive wire layer (40) through the conductive elements (62). In another example shown in FIG. 10, a conductive element (62) comprises of a base (522) with conducting bumps (624) Banned through the base (622). The conductive elements (62) are attached to the breaches (51) (such as the breaches (51) shown in FIG. 9A) of the insulator layer (50). When the single-layer projected capacitive touch panel in accordance with this embodiment is integrated into a display panel, such as liquid display screen, each terminal of a printed circuit board on the display panel is electrically connected to the corresponding wire line of the conductive wire layer (40) through each of the conducting bumps (624) of the conductive elements (62). In an Alternative example, the conductive elements (62) can be made of conductive glue, and filled in the breaches (51) (such as the breaches (51) shown in FIG. 9B) such that. when the single-layer projected capacitive touch panel in accordance with this embodiment is integrated into a display panel, such as liquid display screen, each terminal of a printed circuit board on the display panel is electrically connected to the corresponding signal line of the conductive wire layer (40) through the corresponding conductive element (62) in the breach (51).

In the step of separating the glass parent board into multiple glass covers, the glass parent board is separated into multiple glass covers (10) using a cutting machine.

Figure 11:
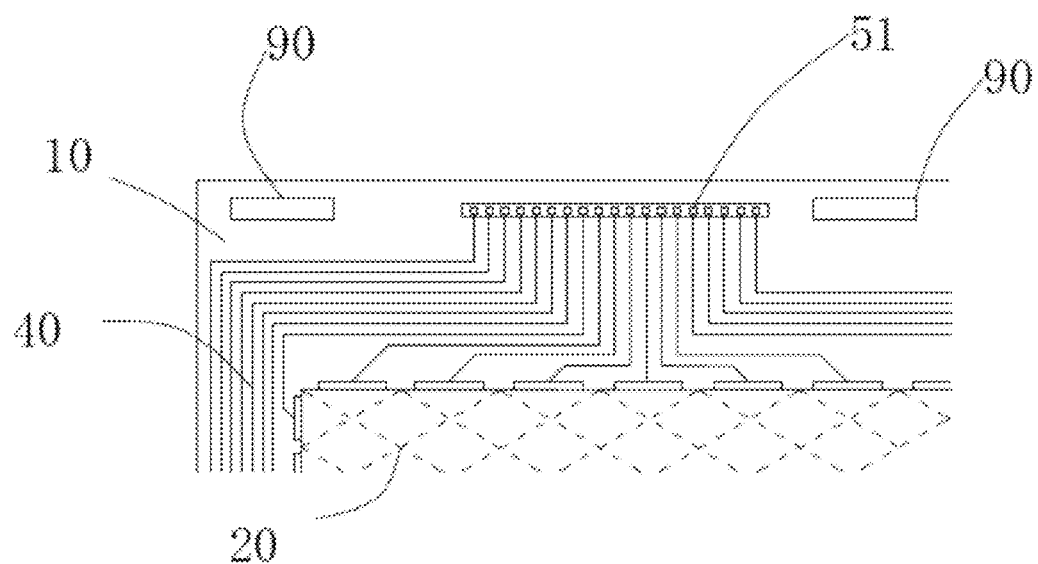
FIG. 11 shows a cross sectional view of a projected capacitive touch panel undergoing a manufacturing process in accordance with the second embodiment of the present invention.
Figure 12:
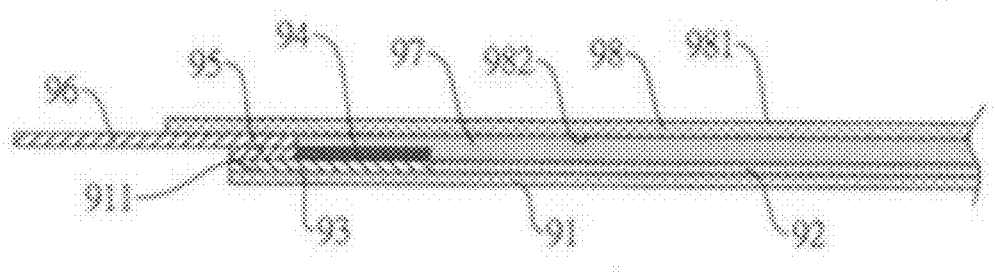
FIG. 12 is a cross sectional view of a conventional projected capacitive touch panel.

With reference to FIG. 11, in the step of attaching fastening members on the circuit surface of the glass cover, the fastening members (90) are attached to the insulator layer (50) of the glass cover (10) such that when the fastening members of the single-layer projected capacitive touch panel in accordance with this embodiment are engaged with the corresponding fastening parts of the display, the single-layer projected capacitive touch panel can be firmly mounted on the display. The fastening members (90) and fastening parts can be detachably engageable with each other by magnetic coupling or attraction. In another example, the fastening members (90) can be bolts, studs and nuts, and the fastening parts are coaxially aligned holes. Therefore, when the fastening member (90) is inserted into the fastening parts, the single-layer projected capacitive touch panel can be firmly mounted on the display.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is clamed is:
1. A projected capacitive touch panel comprising:
    a glass cover having an operating surface and a circuit surface;
    a touch sensing circuit layer having a first edge zone, a second edge zone opposite to the first edge zone and a touch zone, mounted on the circuit surface of the glass cover for generating actuated sensing signals in response to a touch action on the projected capacitive touch panel;
    an insulating ink layer formed on the first edge zone and second edge zone, having multiple through slots on the first and second edge zones such that the through slots expose the touch sensing circuit layer, and each through slot has an electric conductor therein; and
    a conductive wire layer formed on the insulating ink layer and connecting the electric conductors, thereby electrically connecting the first edge zone and the second edge zone of the touch sensing circuit layer via the electric conductors.
2. The projected capacitive touch panel of claim 1, further comprising an insulator layer with at least one breach, formed on the conductive wire layer such that the breach partially exposes the conductive wire layer.

3. The projected capacitive touch panel of claim 2, further comprising a conductive glue layer mounted on the breach thereby covering the exposed conductive wire layer.

4. The projected capacitive touch panel of claim 3, further comprising a flexible printed circuit (FPC) board attached to the conductive glue layer thereby electrically connecting to the conductive wire layer via the conductive glue layer.

5. The projected capacitive touch panel of claim 4, further comprising a consolidating glue layer, wherein the consolidating glue layer is applied to and between the FPC board and the glass cover.

6. The projected capacitive touch panel of claim 5, wherein the consolidating glue layer is located along the outer periphery of the insulating ink layer.

7. The projected capacitive touch panel of claim 2 wherein the insulator layer is made of opaque material.

8. The projected capacitive touch panel of claim 2, further comprising a conductive element attached to the breach covering the exposed conductive wire layer and made of anisotropic conductive film (ACT) or anisotropic conductive paste (ACP).

9. The projected capacitive touch panel of claim 2, further comprising a conductive element having a base with conducting bumps formed through the base, and attached to the breach thereby covering the exposed conductive wire layer.

10. The projected capacitive touch panel of claim 2, further comprising a plurality of breaches and one or more of the conductive elements made of conductive glue filled in the breaches.

11. The projected capacitive touch panel of claim 1, wherein the touch sensing circuit layer includes a plurality of first conductive assemblies with a first end and a second end, parallelly arranged in a first direction, and the conductive wire layer includes a plurality of first signal lines respectively connected to the first end of each first conductive assembly.

12. The projected capacitive touch panel of claim 11, wherein the conductive wire layer further includes a plurality of second signal lines respectively connected to the second end of each first conductive assembly.

13. The projected capacitive touch panel of claim 11, wherein the touch sensing circuit layer further includes a plurality of second conductive assemblies with a first end and a second end, parallelly arranged in a second direction, and the conductive wire layer further includes a plurality of third signal lines respectively connected to the first end of each second conductive assembly.

14. The projected capacitive touch panel of claim 13, wherein the conductive wire layer further includes a plurality of fourth signal lines respectively connected to the second end of each second conductive assembly.

15. The projected capacitive touch panel of claim 13, wherein each of the first conductive assemblies includes a plurality of first conductive cells arranged in an equal-spaced manner along the first direction and each of the second conductive assemblies includes a plurality of second conductive cells arranged in an equal-spaced manner along the second direction.

16. The projected capacitive touch panel of claim 15, wherein the first conductive cells and the second conductive cells are formed in the same layer.

17. The projected capacitive touch panel of claim 13, wherein each of the first conductive assemblies further comprises a plurality of first conductive lines interconnecting the adjacent first conductive cells and each of the second conductive assemblies further comprises a plurality of second conductive lines interconnecting the adjacent second conductive cells.

18. The projected capacitive touch panel of claim 17, wherein the touch sensing circuit layer further comprises a plurality of insulating elements disposed between the first conductive lines and the second conductive lines.

19. The projected capacitive touch panel of claim 18, wherein the first conductive lines are disposed on the insulating elements and electrically coupled with the first conductive cells.

20. The projected capacitive touch panel of claim 18, wherein the insulating elements are made of transparent insulating material.

21. The projected capacitive touch panel of claim 18, wherein the insulating elements, the first conductive cells and the second conductive cells have substantially similar refractive index.

22. The projected capacitive touch panel of claim 21, wherein the refractive index of the insulating elements ranges from 1.5 to 2.1.

23. The projected capacitive touch panel of claim 13, wherein the first conductive assemblies and the second conductive assemblies are arranged perpendicular to each other.

24. The projected capacitive touch panel of claim 1, further comprising a refractive index matching material configured or disposed on the circuit surface of the glass cover.

25. The projected capacitive touch panel of claim 1, wherein the insulating ink layer is made of opaque insulating material.

26. The projected capacitive touch panel of claim 1, further comprising fastening members attached to the circuit surface of the glass cover in order to engage with corresponding fastening parts of a display.

27. The projected capacitive touch panel of claim 1, wherein color of each electric conductor is similar to color of the insulating ink layer.

28. A projected capacitive touch panel comprising:
a glass cover having an operating surface and a circuit surface;
a touch sensing circuit layer with multiple edge zones and a touch zone, mounted on the circuit surface of the glass cover for generating actuated sensing signals in response to a touch action on the projected capacitive touch panel, and comprising a plurality of first conductive assemblies with a first end and a second end opposite to the first end, parallelly arranged in a first direction;
an insulating ink layer formed on the edge zones of the touch sensing circuit layer, having multiple through slots such that the through slots expose the first end and the second end of the first conductive assemblies, and each through slot has an electric conductor therein; and
a conductive wire layer formed on the insulating ink layer thereby electrically connecting the first end and second end of the first conductive assemblies via the electric conductors.

29. The projected capacitive touch panel of claim 28, wherein the conductive wire layer includes a plurality of first signal lines respectively connected to the first end of each first conductive assembly and a plurality of second signal lines respectively connected to the second end of each first conductive assembly.

30. A projected capacitive touch panel comprising:
a glass cover having an operating surface and a circuit surface;

a touch sensing circuit layer with multiple edge zones and a touch zone, mounted on the circuit surface of the glass cover for generating actuated sensing signals in response to a touch action on the projected capacitive touch panel, and comprising a plurality of first conductive assemblies parallelly arranged in a first direction and a plurality of second conductive assemblies parallelly arranged in a second direction, and wherein the first conductive assemblies have a first end and a second end opposite to the first end and the second conductive assemblies have a first end and a second end opposite to the first end;

an insulating ink layer formed on the edge zones of the touch sensing circuit layer, having multiple through slots such that the through slots expose the first end of the first conductive assemblies and the first end of the second conductive assemblies, and wherein each through slot has an electric conductor therein; and a conductive wire layer formed on the insulating ink layer thereby electrically connecting the first end of the first conductive assemblies and the second end of the second conductive assemblies via the electric conductors.

\* \* \* \* \*